United States Patent
Aboujaoude et al.

(10) Patent No.: US 7,367,283 B2
(45) Date of Patent: May 6, 2008

(54) LEAK-PROOF PET BALL

(76) Inventors: Jodi F. Aboujaoude, 132 Alverstone Way, W. Henrietta, NY (US) 14586; Maria E. Aboujaoude, 132 Alverstone Way, W. Henrietta, NY (US) 14586; David D. Lalley, 923 Harvard St., Rochester, NY (US) 14610

( * ) Notice: Subject to any disclaimer, the term of this patent is extended or adjusted under 35 U.S.C. 154(b) by 99 days.

(21) Appl. No.: 10/984,116

(22) Filed: Nov. 9, 2004

(65) Prior Publication Data
US 2005/0120972 A1    Jun. 9, 2005

Related U.S. Application Data

(60) Provisional application No. 60/518,621, filed on Nov. 10, 2003.

(51) Int. Cl.
*A01K 29/00* (2006.01)

(52) U.S. Cl. ............... 119/707; 119/702; 119/709

(58) Field of Classification Search ........... 119/707, 119/702, 709; 473/594, 595, 6; 220/4.25, 220/4.24, 4.21, 676, 560.03; 206/499
See application file for complete search history.

(56) References Cited

U.S. PATENT DOCUMENTS

| | | | | |
|---|---|---|---|---|
| 2,687,302 A * | 8/1954 | Stiegler | ............. | 473/571 |
| 3,679,212 A * | 7/1972 | Smith | ............. | 273/144 B |
| 4,321,888 A * | 3/1982 | Topliffe | ............. | 119/709 |
| D287,988 S * | 1/1987 | Billinghurst | ............. | D21/713 |
| 5,116,255 A * | 5/1992 | Keeling et al. | ............. | 119/475 |
| 5,351,650 A * | 10/1994 | Graves | ............. | 119/707 |
| 5,533,920 A * | 7/1996 | Arad et al. | ............. | 446/409 |
| 5,813,366 A * | 9/1998 | Mauldin, Jr. | ............. | 119/710 |
| 5,965,182 A * | 10/1999 | Lindgren | ............. | 426/104 |
| 6,073,581 A * | 6/2000 | Wang | ............. | 119/51.01 |
| 6,098,571 A * | 8/2000 | Axelrod et al. | ............. | 119/707 |
| 6,109,210 A * | 8/2000 | Nasser | ............. | 119/51.04 |
| 6,186,095 B1 * | 2/2001 | Simon | ............. | 119/707 |
| 6,237,538 B1 * | 5/2001 | Tsengas | ............. | 119/707 |
| 6,363,658 B1 * | 4/2002 | Lai | ............. | 47/79 |
| 6,550,427 B2 * | 4/2003 | Bonner | ............. | 119/707 |
| 6,578,527 B1 * | 6/2003 | Mathers | ............. | 119/707 |
| 6,935,274 B1 * | 8/2005 | Rothschild | ............. | 119/702 |
| D511,029 S * | 10/2005 | Willinger | ............. | D30/160 |

* cited by examiner

Primary Examiner—Teri Pham Luu
Assistant Examiner—Valentina Xavier
(74) Attorney, Agent, or Firm—Jaeckle Fleischmann & Mugel, LLP

(57) ABSTRACT

A pet exercise device having outer and inner shells having first and second apertures defined therein, respectively, is provided. The outer shell has a first raised edge extending from an internal surface of the outer shell, wherein the first raised edge extends around the periphery of the first aperture. The inner shell defines an interior compartment and is positioned within the outer shell to form a retaining chamber between the inner and outer shells. A second raised edge extends from an external surface of the inner shell and around the periphery of the second aperture. Further, the first and second apertures are non-coextensive, staggered or otherwise misaligned with one another so that the liquid or solids are retained within the retaining chamber and not allowed to pass through the second apertures and directly out of first apertures.

17 Claims, 10 Drawing Sheets

LEAK-PROOF PET BALL

CROSS-REFERENCE TO RELATED APPLICATIONS

This application claims the benefit of U.S. Provisional Application No. 60/518,621, filed Nov. 10, 2003.

STATEMENT REGARDING FEDERALLY SPONSORED RESEARCH OR DEVELOPMENT

Not applicable.

BACKGROUND OF THE INVENTION

The present invention relates to a leak-proof pet ball. More particularly, the present invention relates to a pet ball that allows an animal to walk inside the ball to move around the floor of a room while preventing liquids and solids, such as droppings, located within the ball from leaking onto the floor. In addition, the present invention allows for the free flow of air into and out of the interior of the ball to allow the animal to breathe. Further, the pet ball may be easily disassembled for cleaning purposes.

Animals such as dogs, cats, hamsters, and gerbils are typically restricted in the areas in which they can roam. For example, it is not uncommon for dogs and cats to be confined to the interior of a house, or for hamsters or gerbils to be confined to a cage. Due to the limited space available within these environments, pets normally do not get an adequate amount of exercise. Therefore, it is desirable to allow them to leave their normal surroundings for purposes of exercise and for a change in scenery.

Various devices have been developed to allow pets to exercise outside of their normal surroundings. For instance, different types of hamster wheels and pet balls have been developed to allow a pet to exercise outside of its cage. A currently existing hamster ball includes a single shell with holes defined therein to allow a hamster to breathe when positioned within the ball. This type of ball allows the hamster to walk inside the ball, thus making the ball travel around the floor of a house.

While the aforementioned ball allows the hamster to exercise and be removed from the confines of its cage, this device suffers from a number of drawbacks and deficiencies. For instance, the holes in the ball allow the pet to breathe, but they also permit liquid and solids to leak through the holes and come into contact with the floor. The possibility that solids or liquids may leak from the ball discourages a pet owner from putting his or her pet in currently existing ball devices for long periods of time.

Accordingly, there exists a need for a pet ball that ameliorates the aforementioned drawbacks and deficiencies. The present invention fills these needs as well as other needs.

SUMMARY OF THE INVENTION

In order to overcome the above stated problems and limitations, there is provided an exercise device for an animal that allows for the animal to roam around the floor of a house, while at the same time preventing any liquids or solids that may be excreted by the animal from leaking out of the device. Furthermore, the device also allows the animal located within the device to breathe, stay cool, and exercise.

In general, the exercise device of the present invention includes outer and inner shells having first and second apertures defined therein, respectively. The outer shell has a first raised edge extending from an internal surface of the outer shell, wherein the first raised edge extends around the periphery of the first aperture. The inner shell defines an interior compartment and is positioned within the outer shell to form a retaining chamber between the inner and outer shells. A second raised edge extends from an external surface of the inner shell and around the periphery of the second aperture. At least a portion of the first raised edge is spaced a distance from the external surface of the inner shell, and at least a portion of the second raised edge is spaced a distance from the internal surface of the outer shell. Further, the first and second apertures are non-coextensive, staggered or otherwise misaligned with one another so that the liquid or solids are retained within the retaining chamber and not allowed to pass through the second apertures and directly out of first apertures.

The exercise device of the present invention may also form the outer shell as first and second outer pieces. The first and second outer pieces may be coupled to one another using corresponding snap arms and snap openings or using corresponding threaded portions defined on their rims. Further, a gasket may be positioned between the rims of the first and second outer pieces to prevent liquids or solids contained within the retaining chamber from leaking into the external environment. The exercise device of the present invention may also form the inner shell as first and second inner pieces. The first and second inner pieces may either be integrally formed with the first and second outer pieces, respectively, or coupled to one another by press-fitting an inner ridge that extends from the inner shell with an outer ridge that extends from the outer shell.

Additional objects, advantages and novel features of the present invention will be set forth in part in the description which follows, and will in part become apparent to those in the practice of the invention, when considered with the attached figures.

BRIEF DESCRIPTION OF THE SEVERAL VIEWS OF THE DRAWINGS

The accompanying drawings form a part of this specification and are to be read in conjunction therewith, wherein like reference numerals are employed to indicate like parts in the various views, and wherein.

DETAILED DESCRIPTION OF THE INVENTION

Figure 1:
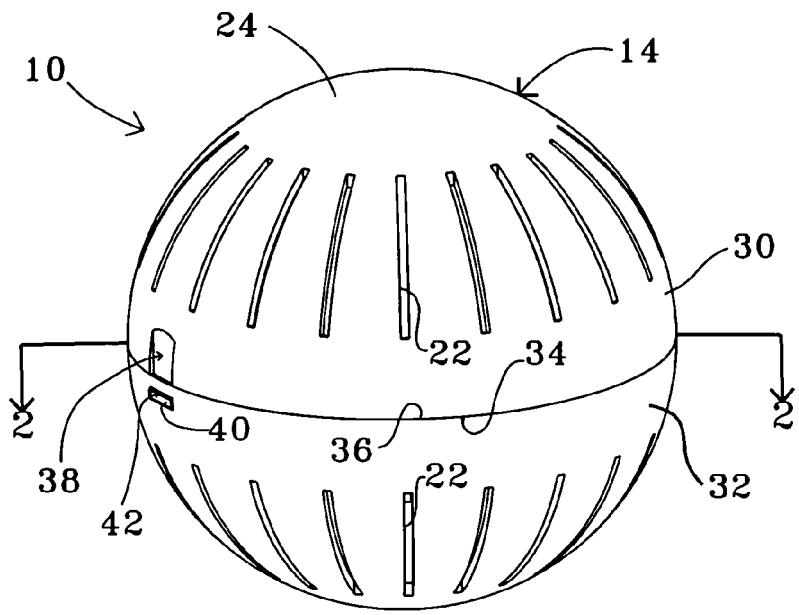
FIG. 1 is a front perspective view of a leak-proof pet exercise device according to the present invention.
Figure 2:
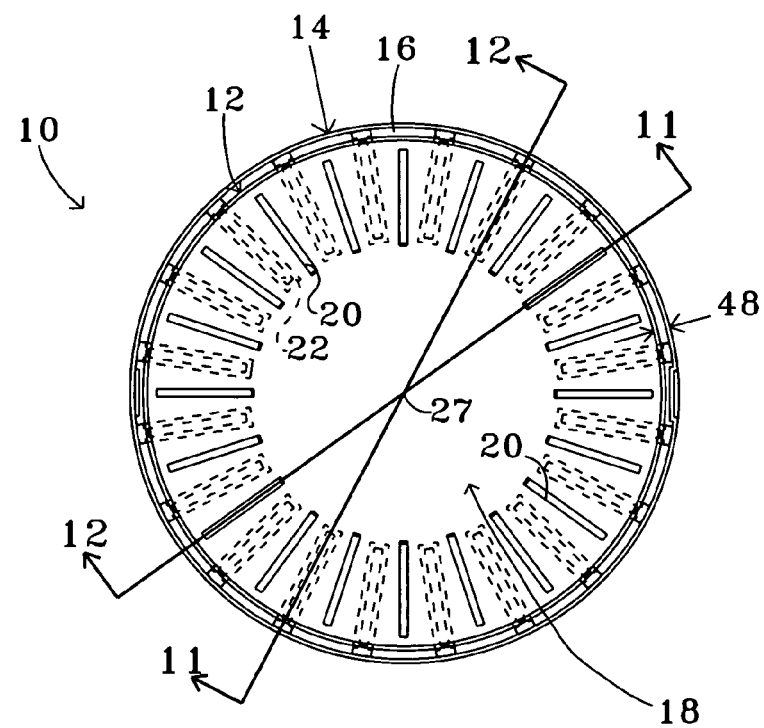
FIG. 2 is a cross-sectional view taken along line 2-2 in FIG. 1 showing an outer shell and an inner shell.
Figure 3:
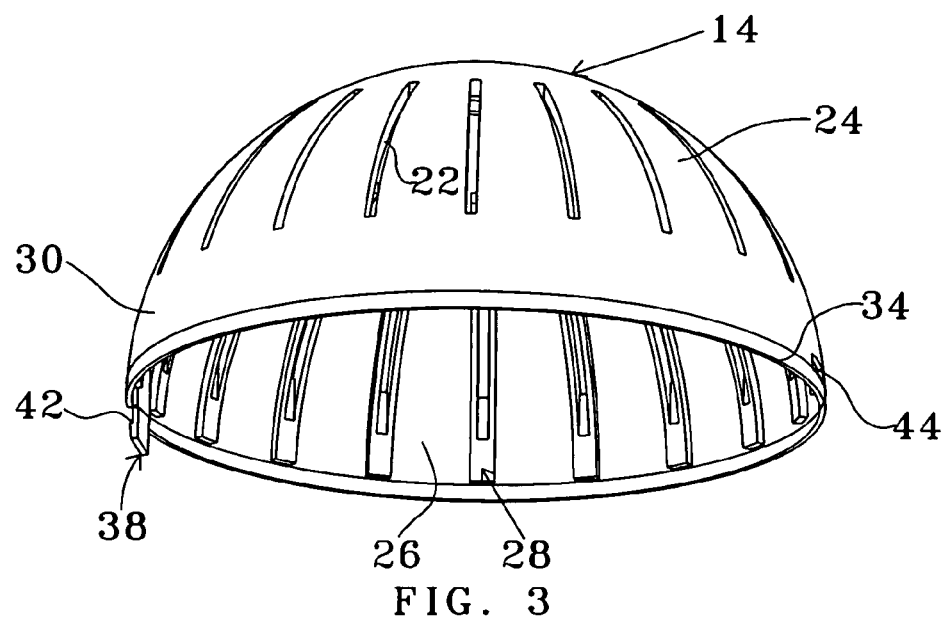
FIG. 3 is a bottom perspective view of a first outer piece of the outer shell shown in FIG. 2.

Referring now to the drawings in detail, and initially to FIGS. 1-3, reference numeral 10 generally designates a leak-proof pet exercise ball or device constructed in accordance with the present invention. In general, the exercise device 10 may include an inner shell 12 positioned within, and spaced apart from, an outer shell 14 to form a retaining chamber 16 therebetween. Inner shell 12 defines a interior compartment 18 for placing an animal or pet therein. One or more apertures 20 may be defined in inner shell 12 to allow liquids or solids, such as urine or droppings, to pass from interior compartment 18 into retaining chamber 16 to keep the animal dry. Further, one or more apertures 22 are defined in outer shell 14 and adapted to retain the liquids and solids within the retaining chamber 16 until removed or otherwise cleaned out by a user.

As such, the animal or pet is able to exercise by walking within interior compartment 18 so that device 10 travels around the floor, while at the same time preventing any liquids or solids that may be excreted by the animal within the confines of retaining chamber 16 from leaking out of device 10. Furthermore, the device 10 also allows the animal located within interior compartment 18 to breathe, stay cool, and exercise.

Figure 4:
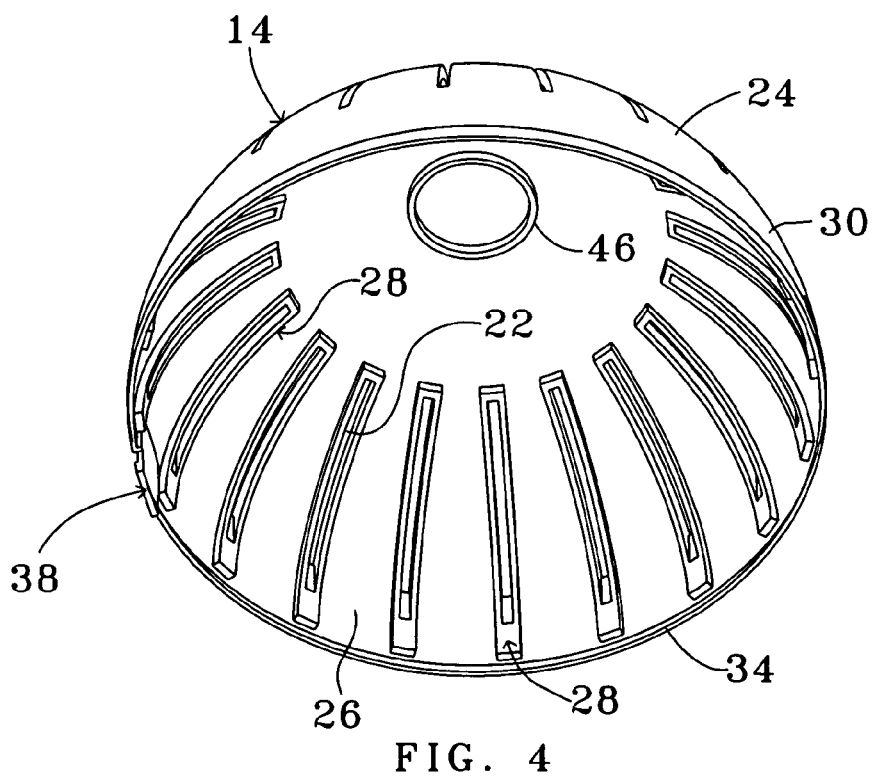
FIG. 4 is a bottom perspective view of the first outer piece shown in FIG. 3.
Figure 5:
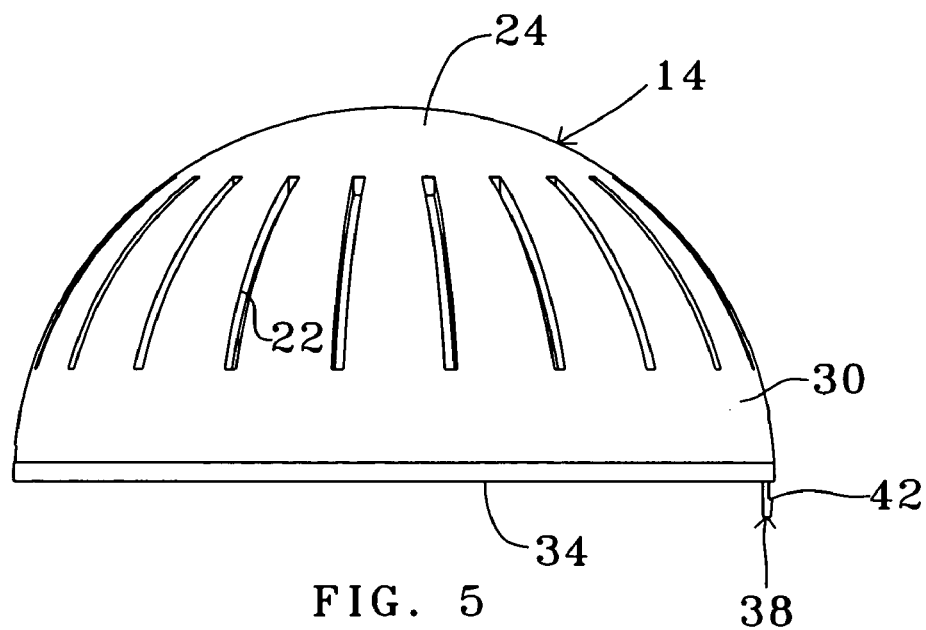
FIG. 5 is a side view of the first outer piece shown in FIG. 3.
Figure 9:
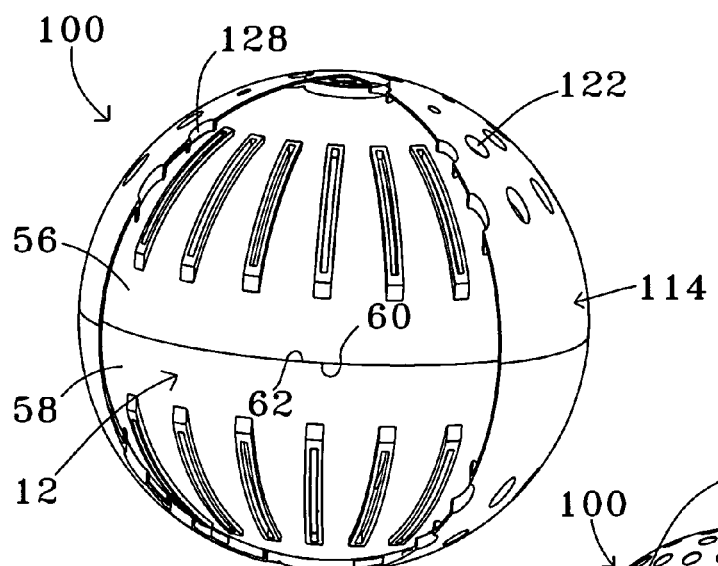
FIG. 9 is a perspective view of an alternative embodiment of the leak-proof pet exercise device shown in FIG. 1 with portions broken away.
Figure 10:
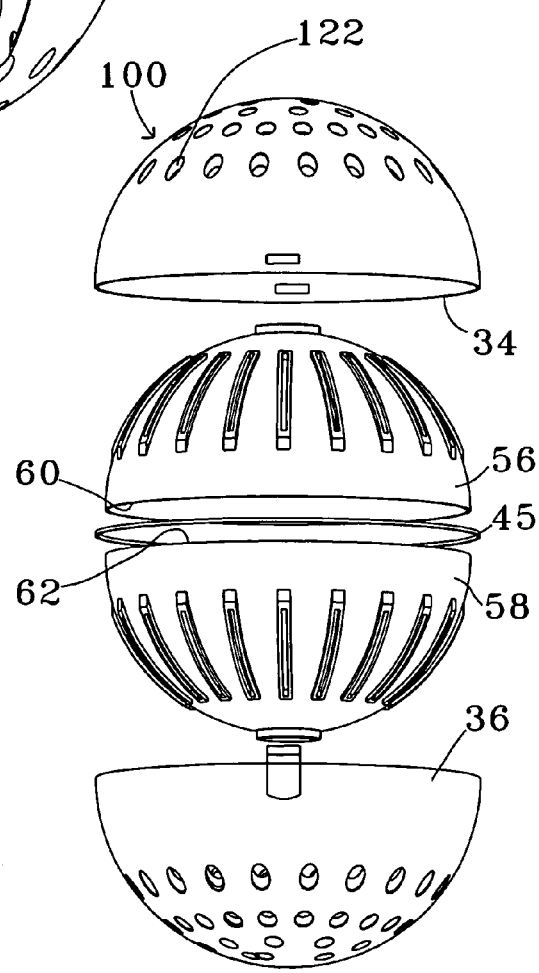
FIG. 10 is an exploded view of the device shown in FIG. 9.
Figure 11:
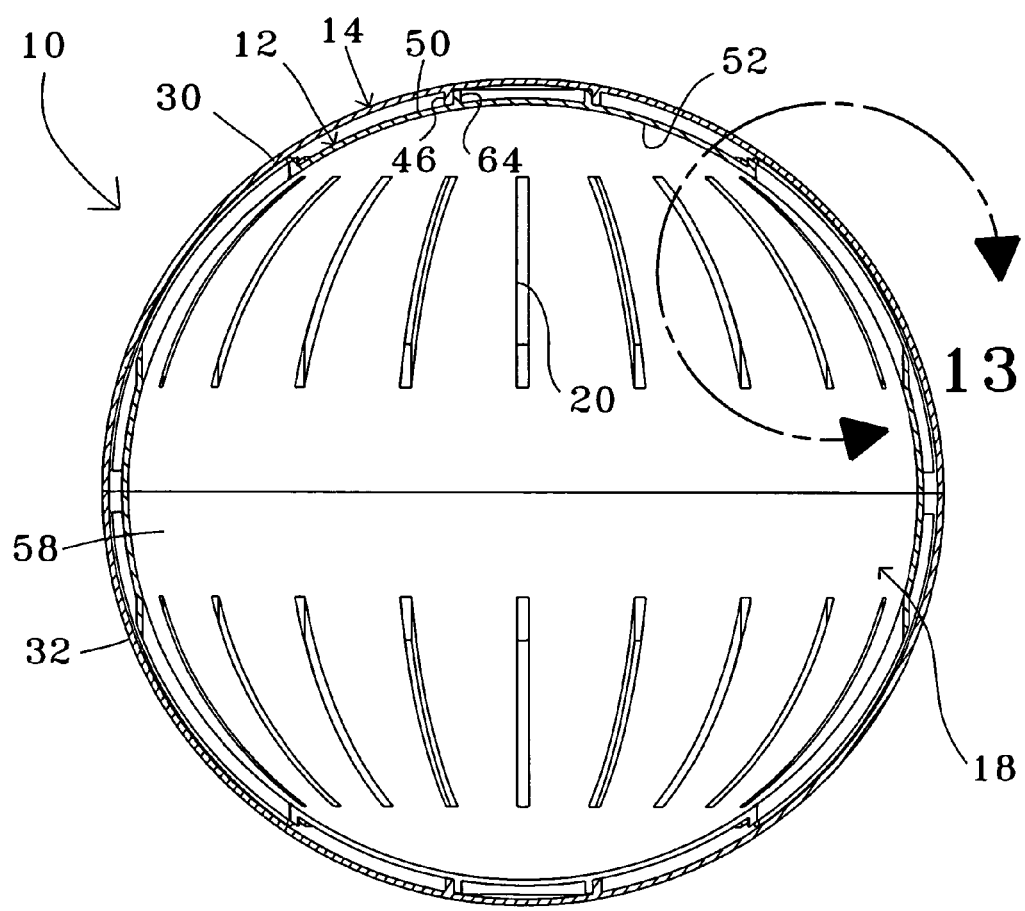
FIG. 11 is a cross-sectional view taken along line 11-11 of FIG. 2.

In particular, as best seen in FIGS. 3-5, outer shell 14 may include an external surface 24 and an internal surface 26 having one or more apertures 22 defined therein. External surface 24 of outer shell 14 may be smooth and spherical to allow device 10 to roll along a surface. While external surface 24 is shown and described as being spherical, it will be understood that other shapes are contemplated and within the scope of the present invention. Apertures 22 may be sized and positioned in outer shell 14 so as to provide adequate air flow into and out of interior compartment 18 of device 10. For example, as best seen in FIGS. 4 and 5, apertures 22 may be rectangular-shaped and spaced apart from one another. Further, apertures 22 may project radially from a point 27 (FIG. 2) and be oriented longitudinally on device 10 (FIG. 5). As best seen in FIGS. 9 and 10, an alternative embodiment of a device 100 may include a circular or oval-shaped apertures 122 defined in outer shell 114.

Figure 12:
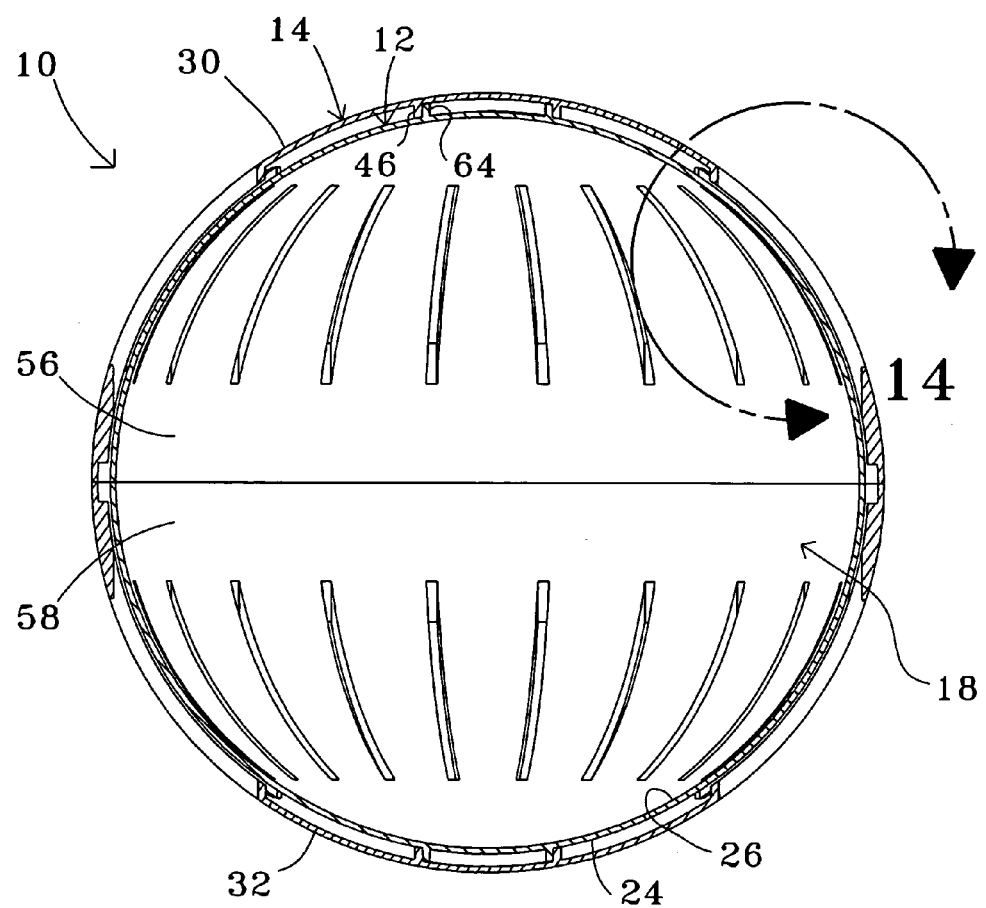
FIG. 12 is a cross-sectional view taken along line 12-12 of FIG. 2.
Figure 14:
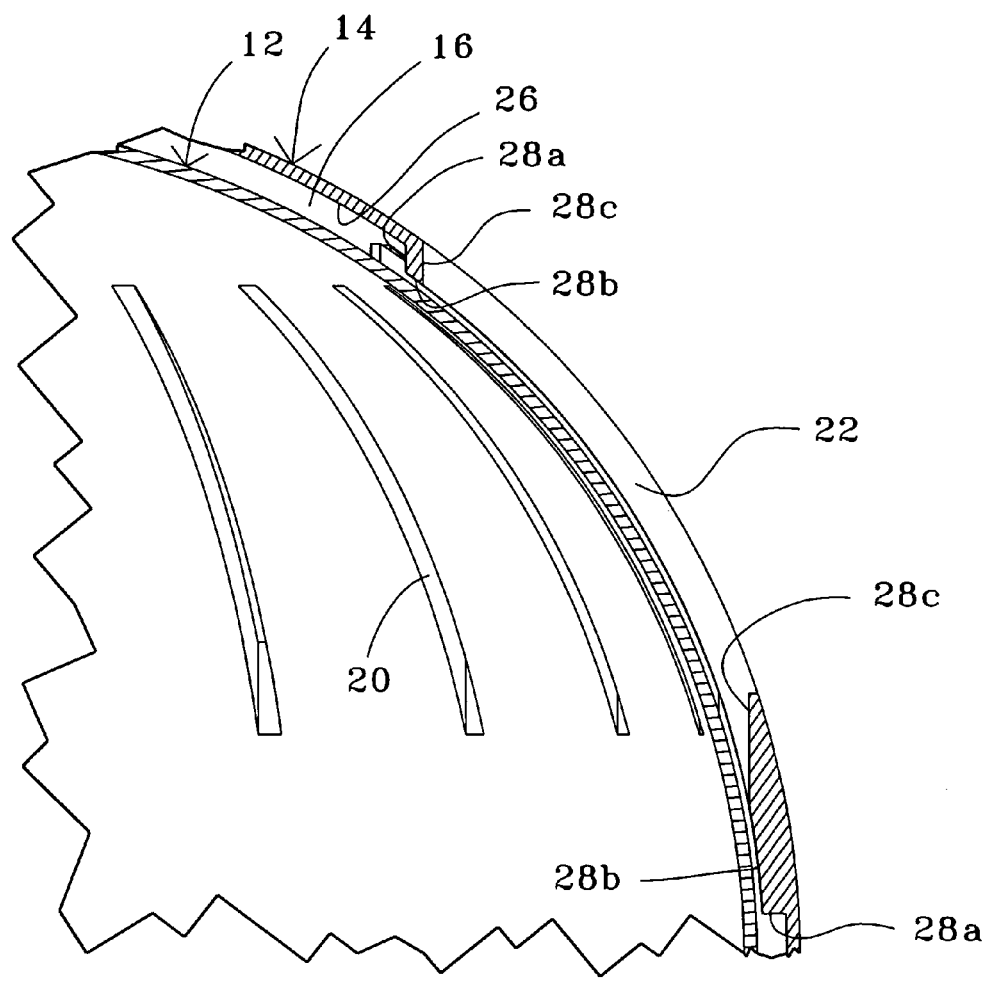
FIG. 14 is a partially enlarged view of the area designated as "14" in FIG. 12.

With reference to FIGS. 2, 4 and 12, internal surface 26 of outer shell 14 may also be generally smooth and spherical so that it corresponds to the shape of its external surface 24. However, as best seen in FIG. 14, a raised edge or wall 28 extends outwardly from internal surface 26 away from external surface 24 of outer shell 14 to retain liquids or solids within retaining chamber 16. Raised edge 28 is associated with one or more of apertures 22 and preferably extends around the periphery of each aperture 22. Therefore, if the aperture 22 is rectangular-shaped, then raised edge 28 may also be generally rectangular-shaped. Also, as best seen in FIG. 9, if aperture 122 is circular or oval-shaped, then raised edge 128 would generally be circular or oval-shaped. As best seen in FIG. 14, raised edge 28 may include an outer surface 28a, a top surface 28b and an inner surface 28c. It will be understood that raised edge 28 may extend outwardly from internal surface 26 so that top surface 28b of raised edge 28 is in contact with inner shell 12. However, a portion of the top surface 28b of raised edge 28 is spaced a distance from inner shell 12 to allow air to flow from outside the device 10, into retaining chamber 16, and into interior compartment 18 to provide fresh air to the animal.

As best seen in FIGS. 1, 3, 4 and 5, outer shell 14 may also be fabricated as first and second outer semi-spherical pieces 30, 32. First and second outer pieces 30, 32 both include corresponding rims 34, 36 that may be joined together to form outer shell 14. For example, as best seen in FIG. 1, first and second outer pieces 30, 32 may be fastened together by inserting a snap arm 38 into a snap opening 40 formed adjacent to rim 36. Specifically, with specific reference to FIG. 5, snap arm 38 on first outer piece 30 extends downwardly from rim 34 and includes a ledge 42 for engaging the corresponding snap opening 40 formed in second outer piece 32. As best seen in FIGS. 3 and 4, a snap opening 44 may also be defined in first outer piece 30 and is adapted to receive a snap arm (not shown) extending from rim 36 of second outer piece 32. It is also within the scope of this invention to position two snap arms on either the first or second outer pieces 30, 32, and define two snap openings in the opposite piece to allow the two pieces 30, 32 to be snapped together.

Figure 15:
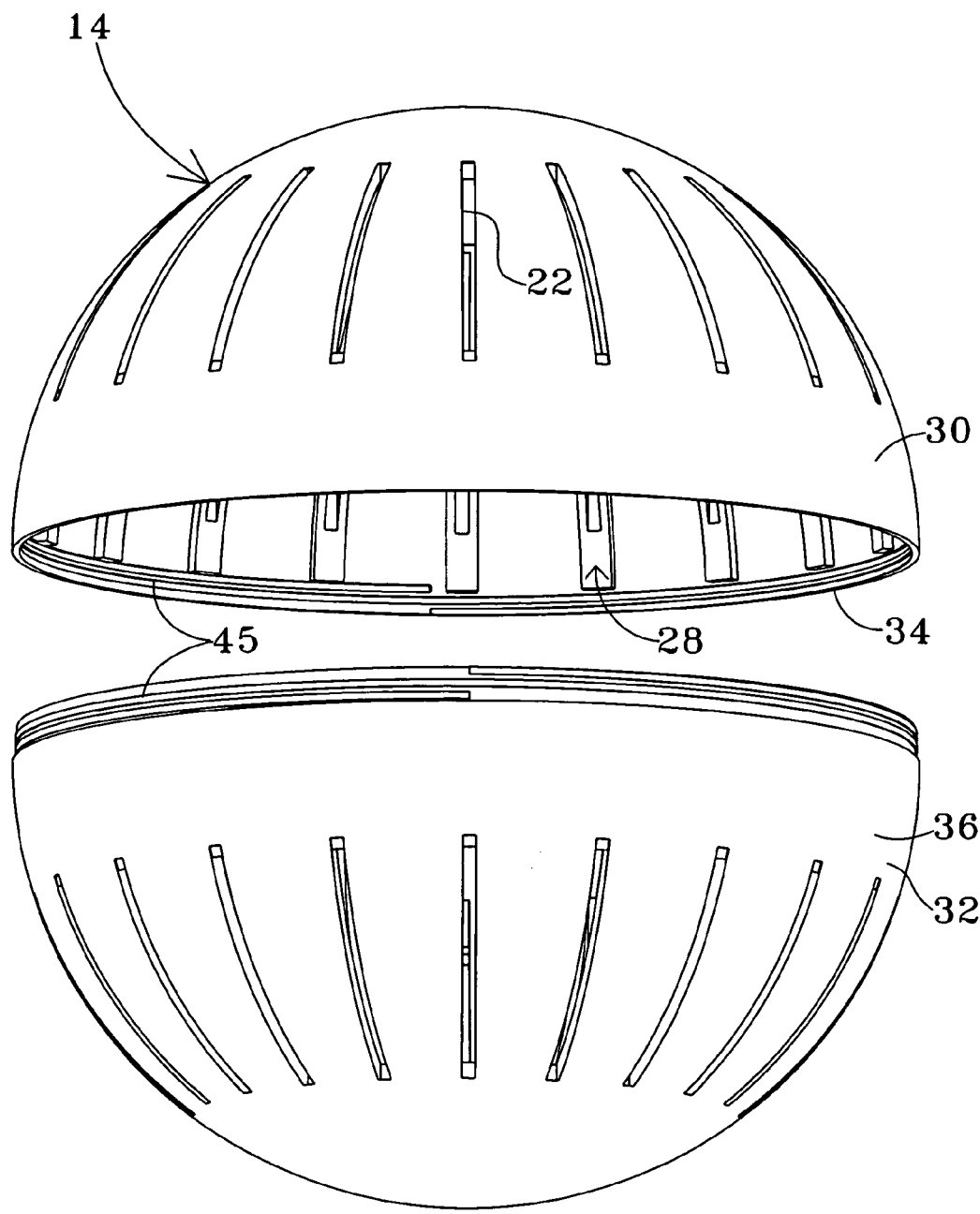
FIG. 15 is a exploded view of the first and second pieces of the outer shell in FIG. 1 having threads defined in their edges.

It is also within the scope of the present invention to threadably couple first and second pieces 30, 32 to one another as best seen in FIG. 15. Using this connection method, threads 45 may be defined in rims 34, 36 to allow first and second outer pieces 30, 32 to be screwed together. Using either of the connection methods described above, a gasket 47 may be positioned on at least a portion of at least one of the rims 34, 36 to prevent liquid or solid leakage through the connection point between first and second outer pieces 30, 32 as best seen in FIG. 10. While the present description describes the use of two pieces to form outer shell 14, it is also within the scope of the present invention to form outer shell 14 from one piece or more than two pieces.

As best seen in FIG. 4, an outer ridge 46 extends outwardly from internal surface 26 of outer shell 14 and may be used to couple inner shell 12 to the outer shell 14, which will be discussed in more detail below. Outer ridge 46 may be ring-shaped, but other shapes and forms are also within the scope of the present invention.

As best seen in FIG. 2, inner shell 12 is positioned within outer shell 14 and spaced apart from outer shell 14 to form retaining chamber 16. The retaining chamber 16 accepts fluid and solids originating from interior compartment 18. The distance 48 between inner and outer shells 12, 14 provides for an adequate amount of fluid and solids to be stored therein, while allowing air to flow from outside the device 10 to within interior compartment 18. The distance between inner and outer shells 12, 14 may be approximately 0.5 of an inch.

Figure 6:
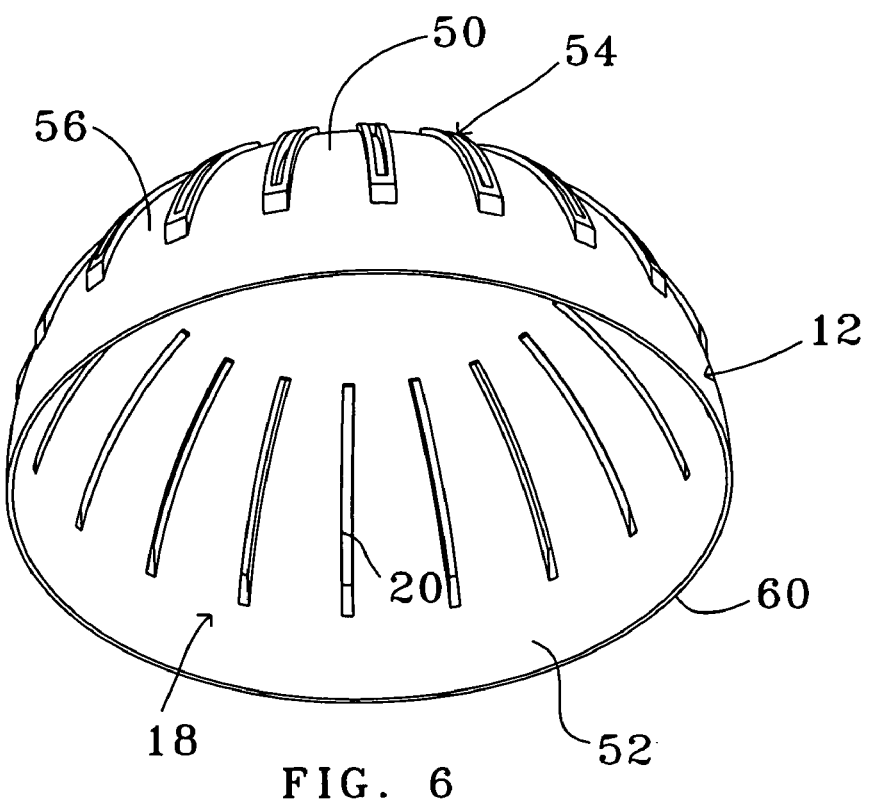
FIG. 6 is a bottom perspective view of the first inner piece shown in FIG. 3.
Figure 7:
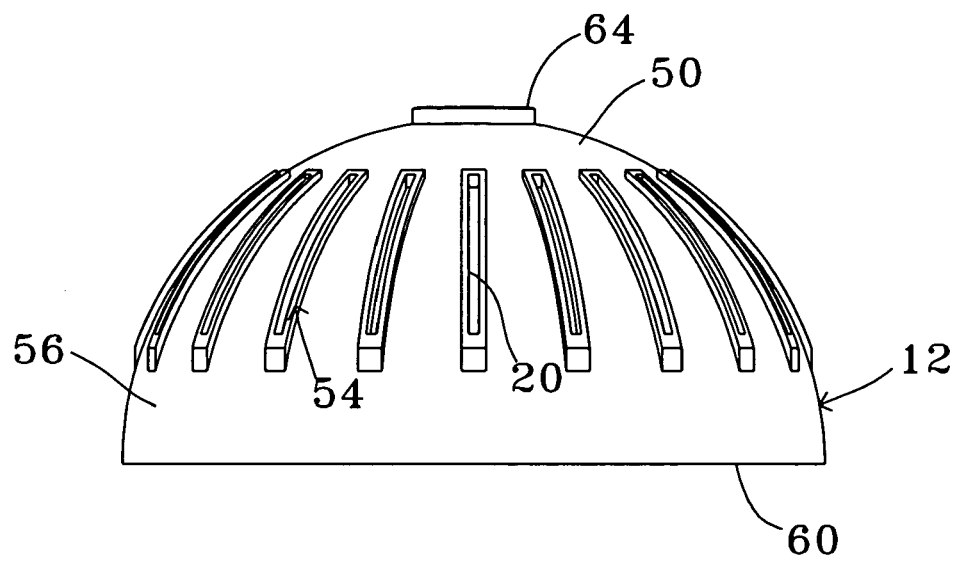
FIG. 7 is a side view of a first inner piece of the inner shell shown in FIG. 2.
Figure 8:
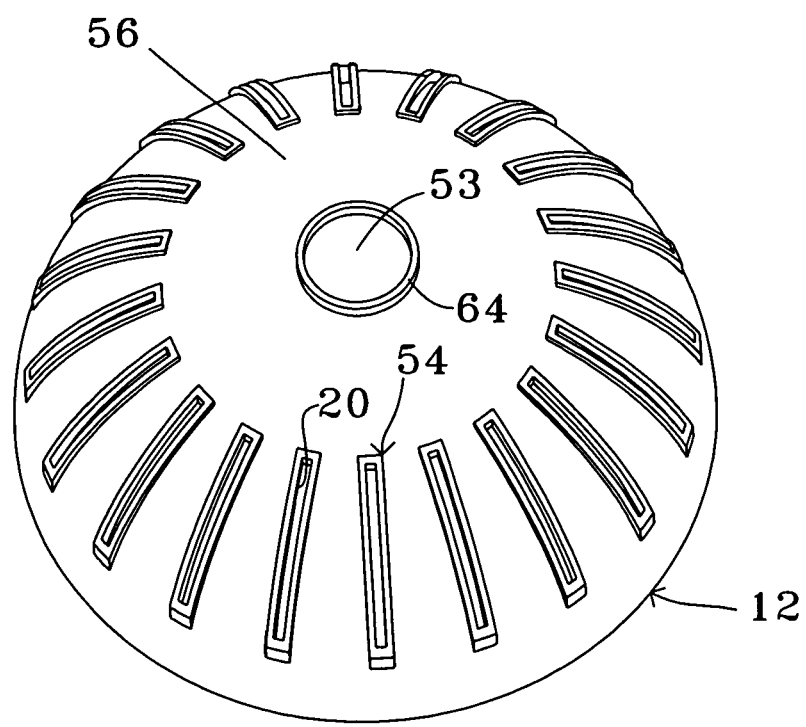
FIG. 8 is a top perspective view of the first inner piece shown in FIG. 7.

As best seen in FIGS. 6 and 7, inner shell 12 may include an external surface 50 and an internal surface 52 having one or more apertures 20 defined therein. Internal surface 52 of inner shell 12 may be smooth and spherical to allow liquid and solids to fall through apertures 20 and get trapped within retaining chamber 16. Further, the smooth internal surface 52 allows the animal to walk inside the device 10 thereby making the device 10 travel around on a surface, such as a floor of a house, while apertures 20 keep the animal clean and dry. While internal surface 52 is shown and described as being spherical, it will be understood that other shapes are also within the scope of the present invention. Apertures 20 may be sized and positioned in the inner shell 12 so as to allow liquid and solids to pass to retaining chamber 16, provide adequate air flow into and out of interior compartment 18 of device 10, and allow the animal to run within the ball without getting its feet caught in apertures 20. For example, as best seen in FIGS. 6-8, apertures 20 may be rectangular-shaped and spaced apart from one another. In addition, apertures 20 may project radially from a point 53 (FIG. 8) and be oriented longitudinally on device 10.

Moreover, the present invention includes misaligning or staggering the one or more apertures 20 formed in inner shell 12 with apertures 22 defined in outer shell 14. In particular, as best seen in FIG. 2, apertures 20, 22 are misaligned or non-coextensive with each other so that liquid passing through one or more of apertures 20 in inner shell 12 does not pass directly out of a corresponding aperture 22 formed in outer shell 14. The apertures 20, 22 are misaligned or placed in an alternating arrangement so that the liquids and solids entering the retaining chamber 16 from interior compartment 18 are captured within retaining chamber 16.

Figure 13:
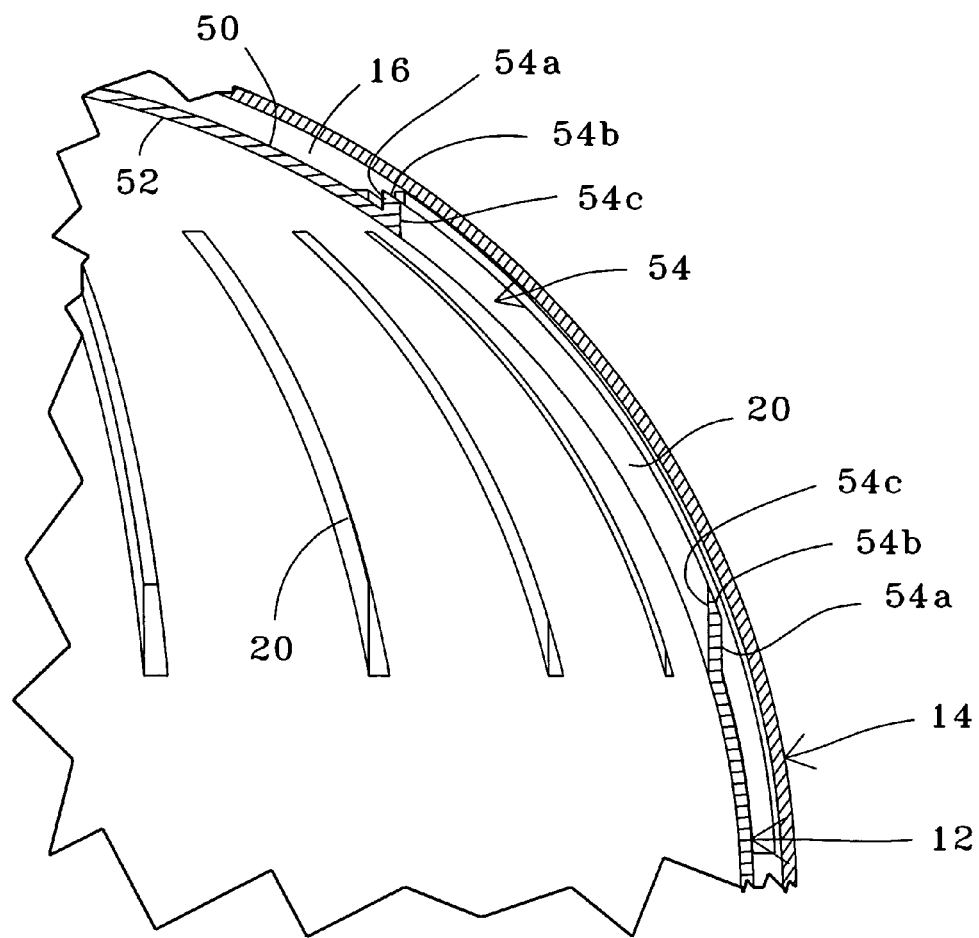
FIG. 13 is a partially enlarged view of the area designated as "13" in FIG. 11.

With reference to FIGS. 6-8 and 11, external surface 50 of inner shell 12 may be generally smooth and spherical so that it corresponds to the shape of internal surface 52 of inner shell 12 and internal surface 26 of outer shell 14. As best seen in FIG. 13, a raised edge or wall 54 extends outwardly from external surface 50 away from internal surface 52 of inner shell 12 to prevent liquid or solids from going through apertures 22 in outer shell 14 as the liquid and solids travel from the inner shell 12 to the outer shell 14 while device 10 is moving. Raised edge 54 is associated with one or more of apertures 20 and preferably extends around the periphery of each aperture 20. Therefore, if the aperture 20 is rectangular-shaped, then raised edge 54 would also be generally rectangular-shaped. Further, if aperture 20 is circular or oval-shaped, then the raised edge would generally be circular or oval-shaped. Raised edge 54 may include an outer surface 54a, top surface 54b and an inner surface 54c.

It will be understood that raised edge 54 may extend outwardly from external surface 50 so that top edge 54a of raised edge 54 is in contact with the internal surface 26 of outer shell 14. However, at least a portion of top surface 54b of raised edge 54 is spaced a distance from outer shell 14 to allow liquids and solids originating from interior compartment 18 to enter retaining compartment 16. Further, raised edge 54 is spaced a distance from outer shell 14 to allow air to flow from outside the device 10, through retaining chamber 16, and into interior compartment 18 to provide fresh air to the animal.

As best seen in FIGS. 6-10, inner shell 12 may also include first and second inner semi-spherical pieces 56, 58. First and second inner pieces 56, 58 both include corresponding rims 60, 62 that may be joined together to form inner shell 12.

In addition, with specific reference to FIGS. 7 and 8, an inner ridge 64 extends outwardly from external surface 50 of inner shell 12 and may be used to couple inner shell 12 to outer shell 14. Inner ridge 64 is ring-shaped, but other shapes and forms are also within the scope of the present invention. With additional reference to FIGS. 11 and 12, inner ridge 64 is sized and positioned so that it may be press-fit, or otherwise coupled, with outer ridge 46 located on outer shell 14. The use of inner and outer ridges 46, 64 allows first outer and inner pieces 30, 56 to be coupled with one another as seen in FIG. 3. The second outer and inner pieces 32, 58 may also be coupled together in a similar fashion. In the alternative, first inner and outer pieces 30, 56 may be integrally molded together so they are an integral top unit, thereby eliminating the need for outer and inner ridges 46, 64. Likewise, second outer and inner pieces 32, 58 also may be integrally molded together to form a bottom integral unit, which may be fastened together with the integrally molded top unit to form device 10.

In operation, the snap arm 38 on first outer piece 30 and the snap arm (not shown) on the second outer piece 32 are pushed inwardly so that the snap arms are released from their respective snap openings 40, 44. First outer and inner pieces 30, 56 are then separated from second outer and inner pieces 32, 58 to provide access to interior compartment 18 of device 10. An animal may then be placed inside interior compartment 18. The rims 34, 60 of first outer and inner pieces 30, 56 are then coupled with rims 36, 62 of second outer and inner pieces 32, 58 so that snap arm 38 on first outer piece 30 and the snap arm (not shown) on second outer piece 32 are snapped, fastened, or otherwise locked within their corresponding snap openings. If device 10 includes a threaded connection between first outer and inner pieces 30, 56 and second outer and inner pieces 32, 58 as seen in FIG. 15, then instead of unsnapping and snapping the parts together, they would be twisted relative to one another to unfasten and fasten the pieces 30, 32, 56, 58. In either case, device 10 is then reassembled with the animal positioned within interior compartment 18.

Once the animal is positioned within device 10, the animal may walk within interior compartment 18 to move device 10 along a surface such as a floor. The apertures 20, 22 formed in inner and outer shells 12, 14, in conjunction with the retaining chamber formed between inner and outer shells 12, 14, permits air to flow into interior chamber 18 thereby allowing the animal to breathe.

If the animal excretes liquids or solids, such as urine or droppings while in device 10, the liquid or solids would pass through aperture 20 formed in inner shell 12 and enter retaining chamber 16 formed between inner and outer shells 12, 14. The misalignment or staggering of the apertures 20, 22 (FIG. 2) will prevent the liquid and solids from passing out of apertures 20 and directly through apertures 22 formed in outer shell 14. Once the liquid and solids are contained within retaining chamber 16, they are prevented from escaping out of apertures 22 by raised edge or wall 28 disposed around each of apertures 22.

To remove the animal from interior compartment 18, device 10 may be opened using a similar procedure as previously discussed above. Once device 10 is opened or disassembled, the animal may be removed so that device 10 may be cleaned by running water or another type of cleanser within retaining chamber 16, as well as within interior compartment 18.

The present invention provides numerous advantages over the aforementioned prior art devices. For example, the pet exercise device according to the present invention allows an animal to roam around a surface, such as the floor of a house, while preventing liquid, solids or droppings produced by the animal from escaping the confines of the device. The device also allows for the free flow of air into and out of the interior compartment to allow the animal to breathe. Thus, the present invention allows a pet owner to put his or her pet within the device, without the fear of having to clean up the floor due to liquid or solids escaping from the device thereby alleviating the time constraints discussed above with respect to currently available pet exercise balls.

While particular embodiments of the invention have been shown, it will be understood, of course, that the invention is not limited thereto, since modifications may be made by those skilled in the art, particularly in light of the foregoing teachings. Reasonable variation and modification are possible within the scope of the foregoing disclosure of the invention without departing from the spirit of the invention.

What is claimed is:

1. An exercise device for an animal, the device comprising:
   an outer shell including an external surface and an internal surface having a first aperture defined therein, the outer shell having a first wall extending outwardly from the internal surface of the outer shell away from the external surface of the outer shell, the first wall extending around the periphery of the first aperture; and
   an inner shell defining an interior compartment and being positioned within the outer shell to form a retaining chamber between the inner and outer shells, the inner shell having a second aperture defined therein, wherein at least a portion of the first wall is spaced a distance from an external surface of the inner shell,
   wherein the inner shell includes an internal surface, wherein a second wall extends outwardly from the external surface of the inner shell away from the internal surface of the inner shell, wherein the second wall is associated with the second aperture, and wherein at least a portion of the second wall is spaced a distance from the internal surface of the outer shell.

2. The device in claim 1, wherein the second wall extends around the periphery of the second aperture.

3. The device in claim 1, wherein the first and second apertures are non-coextensive.

4. The device in claim 1, wherein the first aperture is rectangular-shaped.

5. The device of claim 1, wherein the first aperture is circular-shaped.

6. The device of claim 1, wherein the second aperture is rectangular-shaped.

7. The device in claim 1, wherein the outer shell includes first and second outer pieces.

8. The device in claim 7, wherein the first and second pieces include a snap arm and a snap opening.

9. The device in claim 8, wherein the first and second outer pieces include corresponding rims, wherein a gasket is positioned on at least a portion of at least one of the rims.

10. The device in claim 7, wherein the first and second outer pieces each include corresponding rims, wherein each rim has threads defined therein so that first and second outer pieces are threadably coupled together.

11. The device in claim 7, wherein the inner shell includes first and second inner pieces.

12. The device in claim 11, wherein at least one of the first and second outer pieces includes an outer ridge that extends from the internal surface of the outer shell, and wherein at least one of the first and second inner pieces includes an inner ridge that is press-fit within the outer ridge.

13. The device in claim 11, wherein the first outer piece is integrally formed with the first inner piece, and wherein the second outer piece is integrally formed with the second inner piece.

14. The device in claim 1, wherein at least one of the outer and inner shells are spherical.

15. An exercise device for an animal, the device comprising:
   a generally spherical outer shell including an external surface and an internal surface having a first aperture defined therein, the outer shell having a first wall extending outwardly from the internal surface of the outer shell away from the external surface of the outer shell, the first wall extending around the periphery of the first aperture; and
   a generally spherical inner shell defining an interior compartment and being positioned within the outer shell to form a retaining chamber between inner and outer shells, the inner shell including an external surface and an internal surface having a second aperture defined therein, said inner shell including a second wall extending from the external surface of the inner shell away from the internal surface of the inner shell the second wall extending around the periphery of the second aperture, wherein at least a portion of the first wall is spaced a distance from the external surface of the inner shell, wherein at least a portion of the second wall is spaced a distance from the internal surface of the outer shell, and wherein the first and second apertures are non-coextensive.

16. The device in claim 15, wherein the outer shell includes first and second outer pieces, and the inner shell includes first and second inner pieces, wherein at least one of the first and second outer pieces includes an outer ridge that extends from the internal surface of the outer shell, wherein at least one of the first and second inner pieces includes an inner ridge, and wherein the inner ridge on the inner shell is press-fit within the outer ridge on the outer shell.

17. The device in claim 15, wherein the outer shell includes first and second outer pieces, and the inner shell includes first and second inner pieces, wherein the first outer piece is integrally formed with the first inner piece, and wherein the second outer piece is integrally formed with the second inner piece.

\* \* \* \* \*